(12) United States Patent
Humphrey

(10) Patent No.: US 7,439,859 B2
(45) Date of Patent: Oct. 21, 2008

(54) RF DEVICE IN DRINKWARE TO RECORD DATA/INITIATE SEQUENCE OF BEHAVIOR

(75) Inventor: Richard L. Humphrey, Newport Beach, CA (US)

(73) Assignee: Whirley Industries, Inc., Warren, PA (US)

( * ) Notice: Subject to any disclaimer, the term of this patent is extended or adjusted under 35 U.S.C. 154(b) by 14 days.

(21) Appl. No.: 10/971,487

(22) Filed: Oct. 22, 2004

(65) Prior Publication Data

US 2005/0099304 A1 May 12, 2005

Related U.S. Application Data

(60) Provisional application No. 60/513,662, filed on Oct. 23, 2003, provisional application No. 60/518,904, filed on Nov. 10, 2003.

(51) Int. Cl.
*G06K 19/07* (2006.01)

(52) U.S. Cl. .............. 340/572.1; 340/572.8; 340/691.6; 340/539.11; 235/381; 235/383; 705/17; 705/41; 222/1; 222/66

(58) Field of Classification Search .............. 340/572.1, 340/572.8, 618, 692, 691.6, 539.11; 73/290 R; 206/217; 222/66, 1; 362/101; 141/2, 198; 235/381, 383; 705/17, 41
See application file for complete search history.

(56) References Cited

U.S. PATENT DOCUMENTS

| D38,248 S | 9/1906 | Helmer |
|---|---|---|
| D70,329 S | 1/1926 | Johnson |
| 2,899,098 A | 8/1959 | Gits |
| 3,017,215 A | 1/1962 | Galipeau |
| D195,376 S | 6/1963 | Curtis |
| D209,533 S | 12/1967 | Cole et al. |
| D215,328 S | 9/1969 | Fera |
| D219,163 S | 11/1970 | Welsh |
| D219,529 S | 12/1970 | Uhrmann |
| D222,628 S | 11/1971 | Beckman |
| 3,684,120 A | 8/1972 | Beeman |
| 3,698,868 A | 10/1972 | Bilichniansky |
| D225,363 S | 12/1972 | Welsh |
| D246,882 S | 1/1978 | Thrush |
| 4,074,827 A | 2/1978 | Labe, III |

(Continued)

FOREIGN PATENT DOCUMENTS

EP  0 444 990 A1  2/1991

OTHER PUBLICATIONS

Article from Thermo-Serv website: www.thermoserv.com, (2004).

*Primary Examiner*—Jeff Hofsass
*Assistant Examiner*—Anne V. Lai
(74) *Attorney, Agent, or Firm*—Byron A. Bilicki, Esq.; Rebecca M. K. Tapscott, Esq.; The Bilicki Law Firm, PC

(57) ABSTRACT

A drinkware is provided to provide information to a receiver. The drinkware is a RF device coupled to a handheld drinking container. The RF device can receive and send RF signals and communicate with a sensory device. A transmitter can send a signal to the communication device, which then activates sensory device. The RF device can communicate with the transmitter to control a fountain machine.

17 Claims, 9 Drawing Sheets

U.S. PATENT DOCUMENTS

| | | |
|---|---|---|
| D247,840 S | 5/1978 | Dixson |
| 4,151,923 A | 5/1979 | Bernardi |
| D265,880 S | 8/1982 | Craig |
| 4,469,250 A | 9/1984 | Evezich |
| D279,752 S | 7/1985 | Jagger |
| D282,232 S | 1/1986 | Bussell |
| D288,766 S | 3/1987 | Tardif |
| 4,770,519 A | 9/1988 | Jacques |
| D298,200 S | 10/1988 | Block et al. |
| D307,089 S | 4/1990 | Lage |
| 5,001,907 A | 3/1991 | La Croix et al. |
| D323,620 S | 2/1992 | Patterson |
| D339,068 S | 9/1993 | Bell et al. |
| 5,280,844 A | 1/1994 | Kaufman et al. |
| 5,332,121 A | 7/1994 | Schmidt et al. |
| D350,672 S | 9/1994 | Egger et al. |
| D351,314 S | 10/1994 | Sokolski et al. |
| D367,206 S | 2/1996 | Green |
| D377,738 S | 2/1997 | Thorne |
| 5,603,430 A * | 2/1997 | Loehrke et al. ............... 222/1 |
| D388,281 S | 12/1997 | Trombley |
| 5,711,452 A | 1/1998 | Chaffin |
| 5,862,222 A * | 1/1999 | Gunnarsson ................ 705/77 |
| D406,985 S | 3/1999 | Trombly |
| D408,221 S | 4/1999 | Asberg |
| D412,120 S | 7/1999 | Payne et al. |
| D412,806 S | 8/1999 | Pierce |
| D433,876 S | 11/2000 | Freed |
| 6,152,862 A | 11/2000 | Hobbs |
| D436,802 S | 1/2001 | Kaposi et al. |
| D437,185 S | 2/2001 | Freed |
| D442,436 S | 5/2001 | Kleckauskas et al. |
| D444,349 S | 7/2001 | Lin |
| D451,346 S | 12/2001 | Wyche |
| 6,375,046 B1 | 4/2002 | Alleard et al. |
| D457,035 S | 5/2002 | Hurlbut |
| D457,396 S | 5/2002 | Janky et al. |
| D458,082 S | 6/2002 | Gluck |
| 6,422,422 B1 * | 7/2002 | Forbes ........................ 222/66 |
| D462,575 S | 9/2002 | Gluck |
| D462,578 S | 9/2002 | Janky |
| D464,849 S | 10/2002 | Norris et al. |
| 6,460,739 B1 | 10/2002 | Norris et al. |
| D465,132 S | 11/2002 | Janky et al. |
| D466,371 S | 12/2002 | Parker |
| D467,122 S | 12/2002 | Janky |
| D467,124 S | 12/2002 | Janky |
| D468,588 S | 1/2003 | Norris et al. |
| D469,309 S | 1/2003 | Janky |
| 6,504,481 B2 * | 1/2003 | Teller ...................... 340/572.1 |
| D471,763 S | 3/2003 | Hurlbut et al. |
| D471,764 S | 3/2003 | Janky |
| D472,100 S | 3/2003 | Gullickson et al. |
| D472,101 S | 3/2003 | Janky |
| 6,527,137 B1 | 3/2003 | Kleckauskas et al. |
| 6,546,795 B1 * | 4/2003 | Dietz ...................... 73/290 R |
| D474,367 S | 5/2003 | Turchi et al. |
| D475,891 S | 6/2003 | Bin |
| D476,193 S | 6/2003 | Janky |
| 6,572,016 B2 * | 6/2003 | Saveliev et al. ............. 235/383 |
| D477,183 S | 7/2003 | Janky |
| D477,185 S | 7/2003 | Janky |
| D484,365 S | 12/2003 | Wyche |
| 6,761,318 B2 * | 7/2004 | Dudek et al. ................ 235/487 |
| 7,098,793 B2 * | 8/2006 | Chung .................... 340/572.1 |
| 2003/0063460 A1 * | 4/2003 | Nadel ........................ 362/101 |
| 2003/0071806 A1 * | 4/2003 | Annand .................... 345/418 |
| 2004/0000713 A1 * | 1/2004 | Yamashita et al. .......... 257/728 |
| 2006/0081653 A1 * | 4/2006 | Boland et al. ............... 222/243 |

* cited by examiner

RF DEVICE IN DRINKWARE TO RECORD DATA/INITIATE SEQUENCE OF BEHAVIOR

RELATED APPLICATIONS

This application is based on and claims priority to U.S. Provisional Patent Application No. 60/513,662, filed Oct. 23, 2003 and U.S. Provisional Patent Application No. 60/518,904, filed Nov. 10, 2003. Each of the foregoing applications is hereby expressly incorporated by reference in its entirety.

SUMMARY OF THE EMBODIMENTS OF THE INVENTION

Conventional drinkware may not in itself entertain or enhance the experience of a person at one of the aforementioned locations. In particular, conventional drinkware with advertisements is unlikely entertain or enhance the experience of a person at the amusement park. Further, it is important that amusement parks use drinkware that increases drink sales. Conventional drinkware may not further encourage people to purchase drinks. As a result, people at amusement parks may buy drinks primarily because of thirst, not because of drinkware. Thus, the amusement park is losing drink sales because the drinkware itself may not provide a motivation to purchase the drinkware.

Drinkware found in homes typically does not entertain and is not interactive. For example, in many instances a person plays a video game and a drink is nearby. Unfortunately, the drinkware merely holds a liquid and does not further the video game experience. Thus, conventional drinkware cannot perform functions, thus resulting in reduced drinkware sales and enjoyment.

Restaurants may have a policy that the customer can purchase a cup, which they can fill one time at a self serve fountain machine. If the customer wants to refill their cup, they may have to pay for the refill. Despite the restaurant's policy, customers may refill their cups without making proper payment. The restaurant may also have a policy that customers cannot use a single cup for multiple visits to the restaurant. For example, the restaurant may sell the cup to the customer so that the customer can refill the cup during a single continuous visit, but cannot refill the cup during a subsequent visit. Despite the restaurant's policy, after the customer purchases the cup leaves the restaurant, the customer may return to the restaurant for a second visit and reuse the same cup that they purchased during the first visit without making any payment. The restaurant loses money because the customer did not make the required payment for their drink. Thus, the restaurant loses costly liquid. Additionally, the restaurant may have a lost sale because the customer might have purchased a drink during the subsequent visit if they could not reuse cups.

There is provided in accordance with one embodiment of the present invention a consumer product, desirably drinkware, and more desirably a drinking container that comprises a sensory device coupled to the drinking container. The sensory device is a broad term and includes, for example, a light, vibrator (e.g., a rotating unbalanced mass), speaker, articulating part, visual display, and the like.

In one embodiment, drinking container comprises a receiver/transmitter that is capable of sending and receiving various signals. In one another embodiment, the drinking container comprises a receiver and a switch. The switch can be in communication with the sensory device to activate or deactivate the sensory device. In another embodiment, the drinking container comprises a receiver sensory device capable of receiving a signal.

A RF device is particularly desirable because it can be used to send and receive signals. In one embodiment, the receiver and/or transmitter, such as a RF device, is desirably coupled to the drinking container and is capable of receiving a signal, such as an RF signal. Further, the RF device is in communication with the sensory device. In one embodiment, the drinking container has a power supply connected to both the RF device and the sensory device.

In another embodiment, a drinking system comprises a handheld drinking container, a transmitter, a communication device, and a sensory device. The sensory device is coupled to the handheld drinking container. The communication device is also coupled to the handheld drinking container and is in communication with both the transmitter and the sensory device.

In one embodiment, the transmitter can send a signal (e.g., RF signal) and the communication device can receive the signal. Further, the communication device comprises a RF chip powered by a power supply that can send a RF signal. In another embodiment, the communication device comprises a radio frequency identification chip. Further, a timer can be in communication with the communication device and/or the sensory device.

In one embodiment, a method of dispensing a liquid comprises providing a handheld drinking container having a RF device. A transmitter is provided that communicates with the RF device. A fountain machine being capable of dispensing a liquid is controlled in response to the communication between the transmitter and the RF device. Further, the handheld drinking container can be a disposable cup. The fountain machine can be controlled based on the amount of liquid dispensed into the handheld drinking container.

DETAILED DESCRIPTION OF THE EMBODIMENTS OF THE INVENTION

Figure 1:
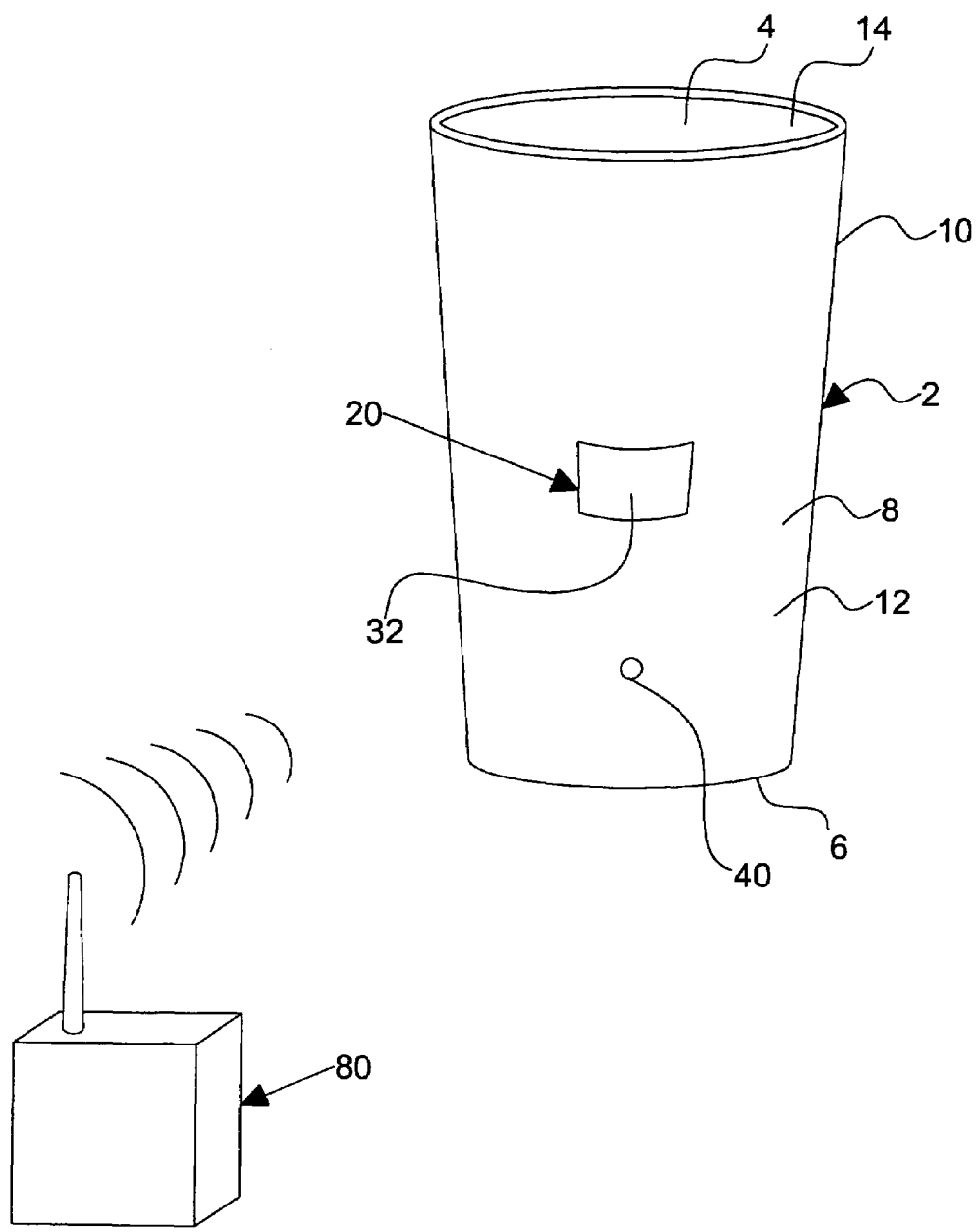
FIG. 1 is a schematic illustration of a drinkware device and a transmitter.

FIG. 1 is a schematic illustration of a drinkware device 2 comprising a handheld container 10 capable of holding liquid having a communication device or radio frequency (RF) device 20, which is in communication with a sensory device 40. Drinkware as used herein is intended as a broad term and includes, for example, cups, mugs, straws, bottles, etc. RF device 20 communicates with sensory device 40 in response to signals (e.g., a RF signal) received from a transmitter 80, for example, in the form of a RF transmitter 80.

Container 10 can hold liquid and is configured so that a person can conveniently hold and drink the liquid. In the illustrated embodiment of FIG. 1, container 10 is a tapered cylindrical cup having an opening 4 at one end and a closed bottom 6 at the other end. Container 10 has a wall 12 extending between opening 4 and bottom 6 and has inner surface 14 and an outer surface 8. Container 10 is sized to be conveniently held by a person and can be made of glass, plastic, ceramic, coated cardboard/paper, wood pulp, etc. Additionally, container 10 can be disposable or reusable. For example, container 10 made from a ceramic is washable and reusable.

Figure 1A:
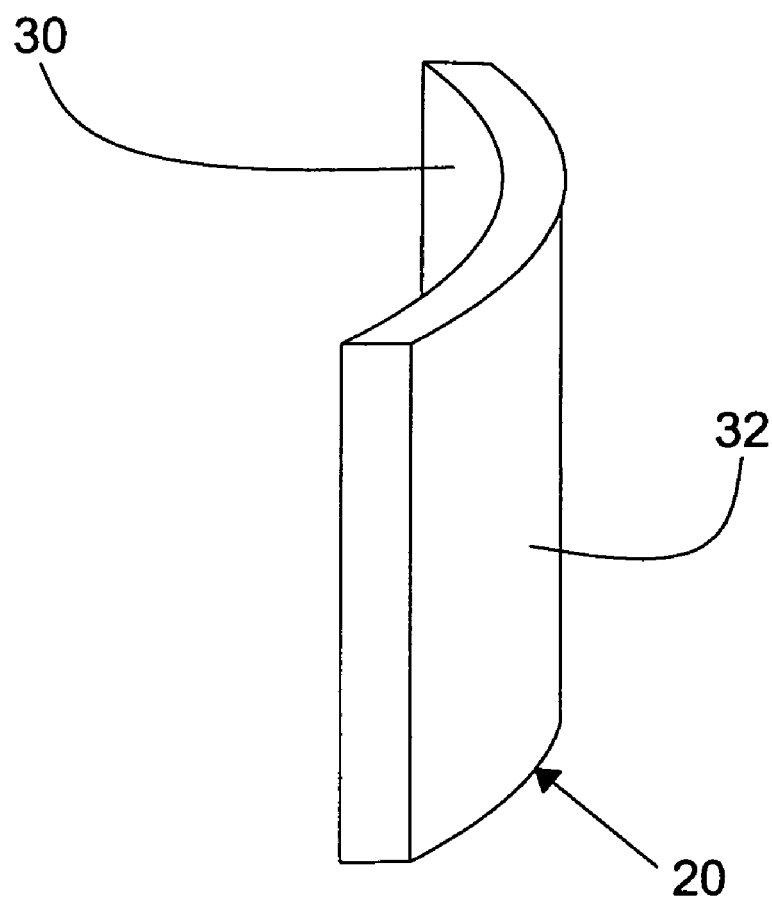
FIG. 1A is an illustration of a communication device.

RF device 20 is coupled to container 10 and communicates with sensory device 40. In the illustrated embodiment of FIG. 1, RF device 20 is attached to outer surface 8 of container 10 by, for example, an adhesive or fasteners. For example, an adhesive, such as epoxy, can couple a back face 30 (as shown in FIG. 1A) of RF device 20 to surface 8 of container 10. Back face 30 can have a curved surface with a curvature similar to the curvature of surface 8 to ensure a secure bond between RF device 20 and container 10. Additionally, RF device 20 can be flexible so that back face 30 can conveniently attached to surface 8. Those skilled in the art recognize that there are various techniques for coupling RF device 20 to container 10. For example, although not illustrated, RF device 20 can be attached to inner surface 14 of container 10. A protective layer or housing can prevent contact between the electrical components/circuits of RF device 20 and the liquid held within container 10. RF device 20 can be part of a label that can be conveniently attached to container 10. For example, the label could be either an advertisement or data (e.g., a bar code) related to the container or liquid. For easy manufacturing, the label can have an adhesive side that can be conveniently affixed to a conventional container (e.g., cup, glass, mug). The label could be attached to container 10 in a plurality of positions, for example, on inner surface 14, outer surface 8, bottom 6 of container 10, etc. Additionally, inexpensive disposable labels can be coupled to containers 10, which are disposable. In one embodiment, RF device 20 can be imbedded in wall 12 of container 10. For example, RF device 20 can be imbedded in inner surface 14 or outer surface 8. Container 10 can also be a disposable cup, for example, as sold a restaurant, as discussed below.

In one embodiment, RF device 20 is a radio frequency identification chip (RFID). Transmitter 80 provides an output that powers RF device 20. In other words, RF device 20 does not require a power supply 26 because RF device 20 can have a circuit 80 powered by transmitter 80. Circuit 80 can modulate waves, which are then are sent back to a receiver.

Figure 2:
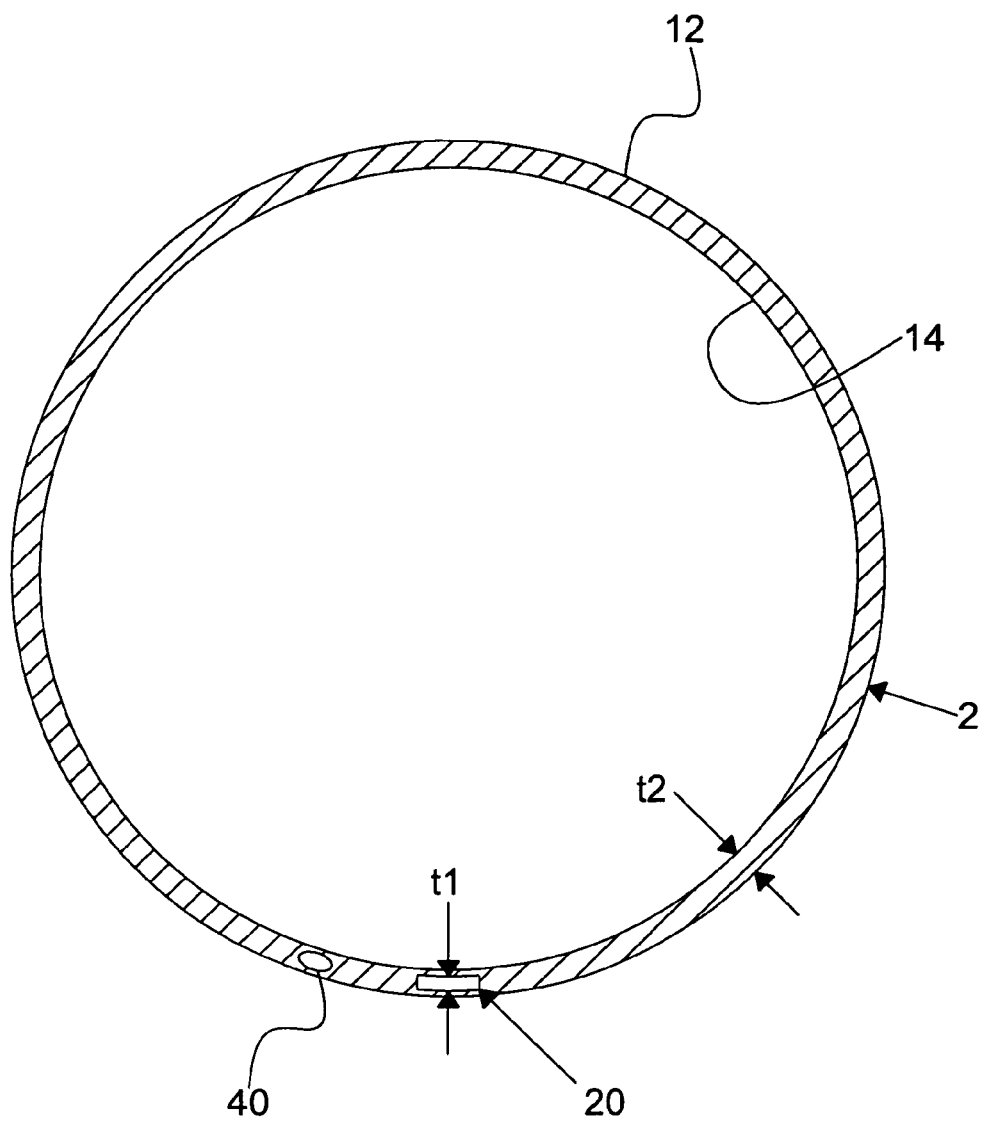
FIG. 2 is a cross-sectional view of the drinkware device.

Sensory device 40 generates or provides an output that can be perceived by a person. For example, sensory device 40 can be a light, vibrator (e.g., a rotating unbalanced mass), speaker, articulating part, visual display, or the like. Sensory device 40 can be adapted to provide an output that is related to the proximate environment. For example, drinkware device 2 has sensory device 40 in form of a light and can be sold at a baseball stadium. When a batter hits a home run, sensory device 40 located in the stands can be illuminated. Thus, plurality of drinkware devices 2 can be illuminated resulting in a spectacular display of light. Alternatively, sensory device 40 could be a shape or symbol that could be light up. For example, an amusement/entertainment park can have a show where people in the audience have drinkware device 2. Sensory device 40 can be a symbol (e.g., Mickey Mouse) related to the show and could light up at various strategic times in during the show. Similarly, the audience may enjoy the visual display of sensory devices 40, which may promote sales of drinkware 2. Thus, various sensory devices 40 can be used throughout a single venue to further enhance people's enjoyment, while increasing drink sales. Those skilled in the art recognize that sensory device 40 could be disposed on outer surface 8 or inner surface 14 of container 10, within wall 12, on bottom 6, or the like. For example, sensory device 40 in the form of a light could be attached to outer surface 8, while sensory device 40 in the form of a vibrator could be embedded in wall 12 (as shown in FIG. 2). Thus, there can be a plurality of sensory devices 40 in various locations of drinkware 2.

Transmitter 80 can send a signal to RF device 20 and has a range of 0-300 yards. Thus, transmitter 80 can send a signal to RF device 20 up to an access point 300 yards away. In one embodiment, there can be a plurality of transmitters 80 that form a network for communicating with RF device 20. For example, an amusement park can have the plurality of transmitters 80 that are strategically placed throughout the park such that RF device 20 can receive a signal anywhere in the park. Alternatively, the amusement park could provide signal from transmitter 80 to particular regions of the park. In operation, transmitter 80 can send information or instructions to RF device 20. In one embodiment, transmitter 80 can instruct RF device 20 to activate or deactivate sensory device 40. For example, RF device 20 can activate sensory device 40 for a period of time or sequence. Those skilled in art recognize that device 20 can include a circuit, controller, receiver and/or transmitter, or the like that can perform a series of steps in response to the transmission or signal. Device 20 can illuminate a series of illuminated images in order to give the appearance of movement, such as a fish or whale jumping.

Device 2 may be adapted to include a timer that is in communication with sensory device 40 and/or device 20. For example, device 20 could activate sensory device 40 and the timer can be employed to deactivate sensory device 40 at a desired time. Of course, the timer can be employed so that device 20 sends a signal to a receiver at a desired time.

FIG. 2 illustrates one embodiment of drinkware device 2 comprising container 10 with wall 12, which surrounds RF device 20. Wall 12 can reduce damage to embedded RF device 20 because liquid cannot contact RF device 20. Additionally, wall 12 can reduce damage to RF device 20 from incidental contact, such as by bumping drinkware device 2 against a surface. Drinkware device 2 can be formed by molding container 10 around RF device 20. The molding process can be a one step or a multi-step process. For example, a first portion of container 10 can be molded and then RF device 20 can be attached to the first portion. An overlay or second portion can then be formed over both the first portion and RF device 20. Of course, RF device 20 can have various shapes and sizes. RF device 20 is adapted to have a thickness t1 less than then the thickness of t2 of wall 12. Those skilled in the art recognize that various techniques can be employed for embedding the RF receiver in container 10.

Figure 3:
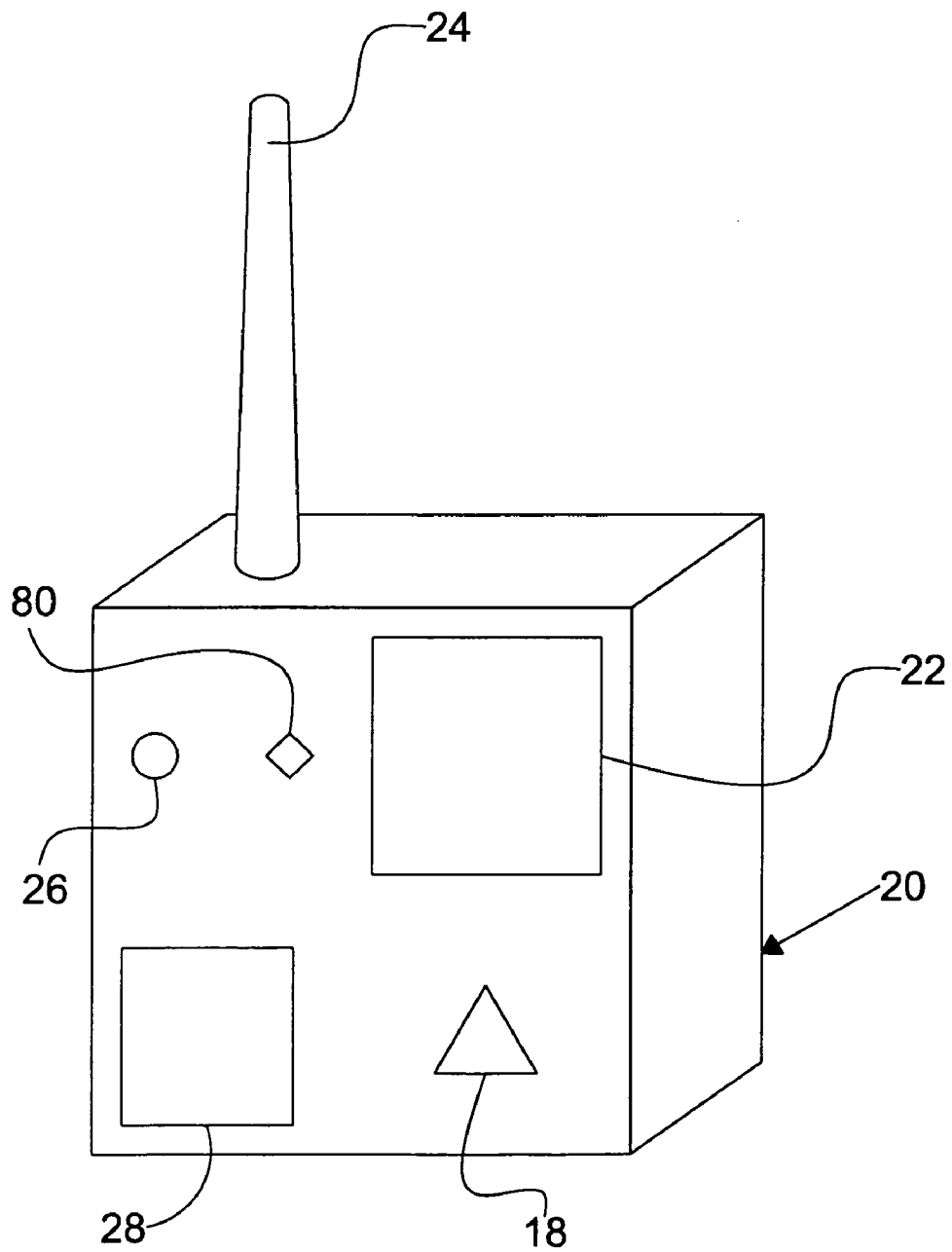
FIG. 3 is a schematic illustration of a communication device.

FIG. 3 is a schematic illustration of RF device 20 comprising an antenna 24 in communication with a RF chip 22 powered by power supply 26. Power supply 26 may be any known power supply in the art, for example, for example, a battery. Antenna 24 is capable of receiving a signal sent by transmitter 80 (shown in FIG. 1), or transmitting a signal to transmitter 80. Antenna 24 communicates the signal sent from transmitter 80 to RF chip 22. RF chip 22 can energize or actuate sensory device 40, which may also be powered by power supply 26. RF chip 22 is approximately 2 mm wide and 2 mm long and can receive the signal sent by transmitter 80 up to 300 yards away. In one embodiment, RF device 20 has an amplifier 28 to ensure that the signal from RF chip 22 can drive sensory device 40. In the illustrated embodiment of FIG. 3, RF device 20 comprises storage device 18 for storing data that can be transmitted from RF device 20 to a receiver 90. Receiver 90 can receive and interpret the data, as discussed below. Those skilled in the art recognize that other embodiments of RF device 20 may comprise RF chip 22. RF chip 22 can be in communication with various separate components, such as power supply 26, antenna 24, storage device 18, and amplifier 28.

Figure 4:
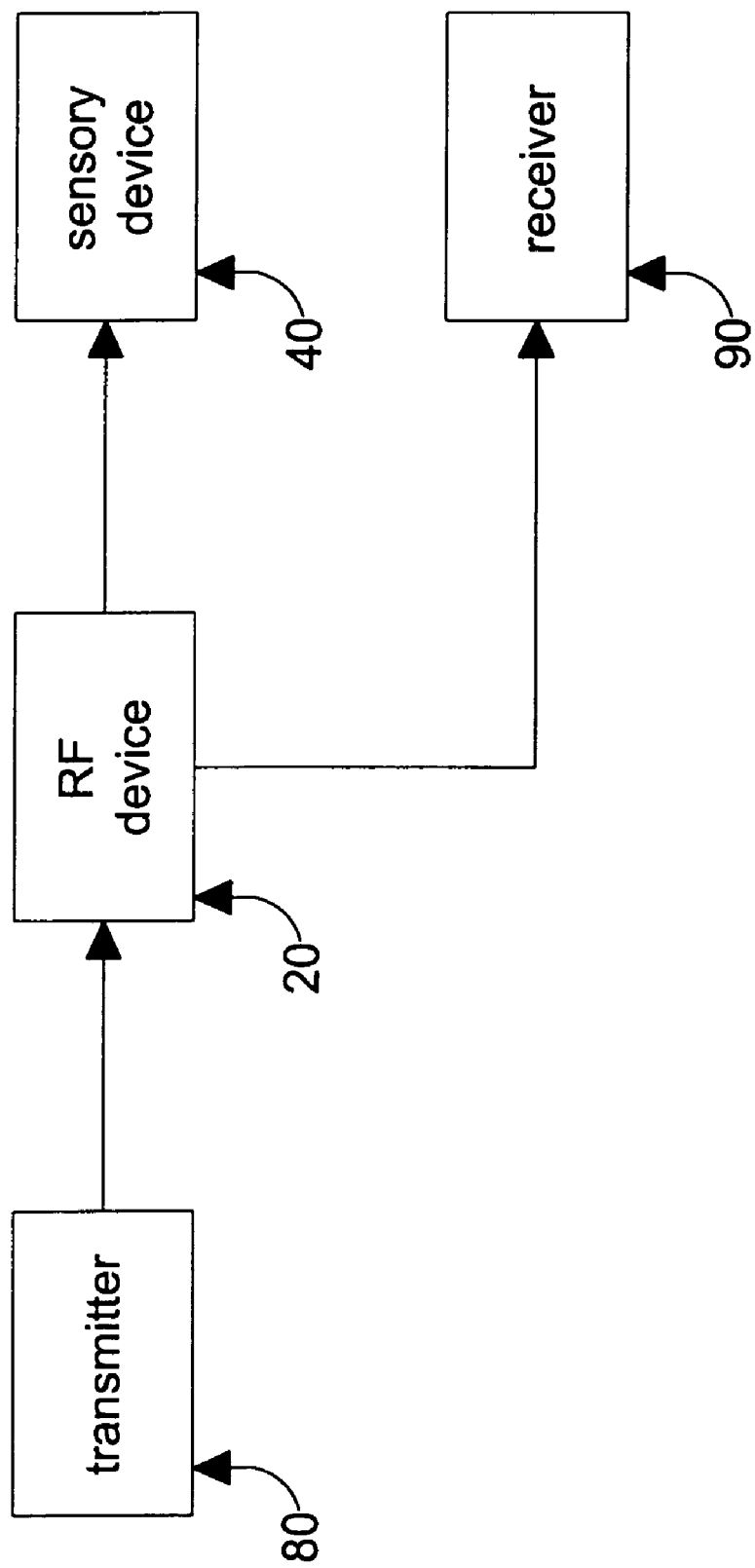
FIG. 4 is a block diagram of a transmitter and a communication device.
Figure 5:
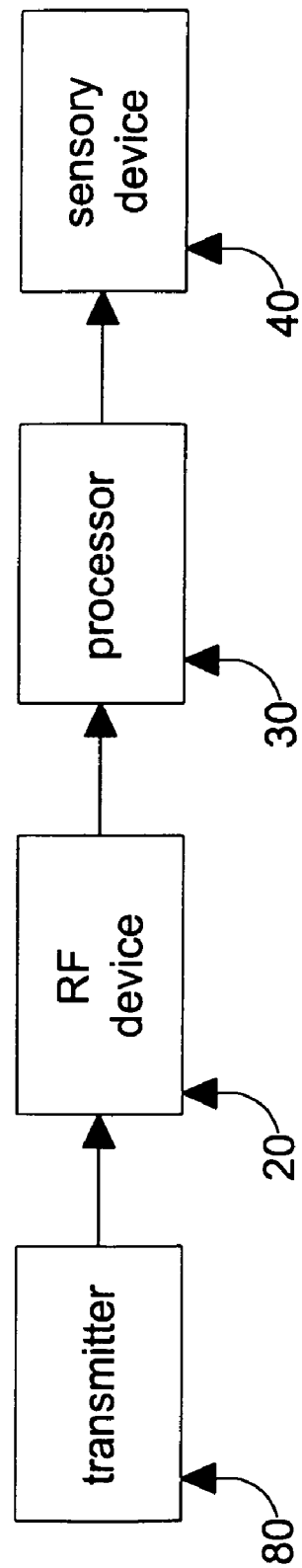
FIG. 5 is a block diagram of a transmitter and a communication device in accordance with another embodiment.

FIG. 4 is a block diagram of a transmitter and a communication device. In one embodiment, RF device 20 can receive a first signal from transmitter 80 and can transmit a second signal to receiver 90. FIG. 5 is a schematic illustration of a processor 30 in communication with RF device 20 and sensory device 40. In one embodiment, processor 30 receives a signal from RF chip 22 and processes the signal and then sends the processed signal to sensory device 40. Processor 30 can be part of RF device 20 or a separate component.

In operation, transmitter 80 sends a signal or signals to RF device 20, which activates sensory device 40. Sensory device 40 is powered by power supply 26 or an alternative power supply and is activated for a period of time or a sequence. The period of time can be related to the surrounding environment, such as events during a show. Alternatively, RF device 20 can receive a first signal from transmitter 80 to activate sensory device 40. Sensory device 40 remains activated until RF device 20 deactivates sensory device 40 in response to second signal from transmitter 80. Alternatively, RF device 20 can activate sensory device 40 for a sequence. For example, sensory device 40 can be light or series of lights that is illuminated for repeating periods of time.

In one embodiment, RF device 20 functions as a receiver and transmitter for information data. For example, RF device 20 can be a receiver that programmed (i.e., stored on the storage device 18) with a user's information, such as their name, age, sex, and drink type. RF device 20 can be programmed by a signal sent from transmitter 80 or directly by the user. When the user goes to a vendor (e.g., a concession stand, bar, restaurant) the user's information is transmitted from RF device 20 to transmitter/receiver 80, which is in communication with the vendor. The transmitted information can be provided to workers at the vendor so that the workers can greet the user by name resulting in a very personal and enjoyable experience. Drinkware device 2 also permits the vendor to track and monitor the sales of drinks. The vendors can use the information when taking inventory, advertising, performing behavioral analysis, and the like. If the vendor has many distribution locations (such as an amusement park with many concession stands), a network can link all the distribution locations. Thus, workers at different distribution locations can greet the user by name and engage is a pleasant conversation. For example, a worker at an amusement park can ask the user whether they enjoyed their last show, event, ride, or the like. This can increase the user's enjoyment level while at the amusement park.

In one embodiment, RF device 20 stores information corresponding to an amount of money. For example, the user could purchase drinkware device 2 charged with $30, which is stored by storage device 18 of RF device 20. When the user buys a refill, the vendor can simply deduct the amount of money stored on storage device 18 by the cost of the drink/refill. The user can simple carry drinkware device 2 to the cashier and does not have to carry around money, a debt card, or a charge card. Alternatively, vendors can sell drinks with a limited number of refills. For example, a self-serve restaurant can sell a drink cup that includes two refills. When the user refills drinkware 2, RF device 20 and transmitter 80, which is in communication with the fountain machine, communicate so that the refill is recorded. After two refills, the fountain machine will not refill user's drinkware 2. Of course, communication device 20 can be a passive device that is recognized by the receive. The receiver can be on the fountain machine and monitors the number of refills obtained by the user. Communication device 20 does not require power supply 26.

Figure 7:
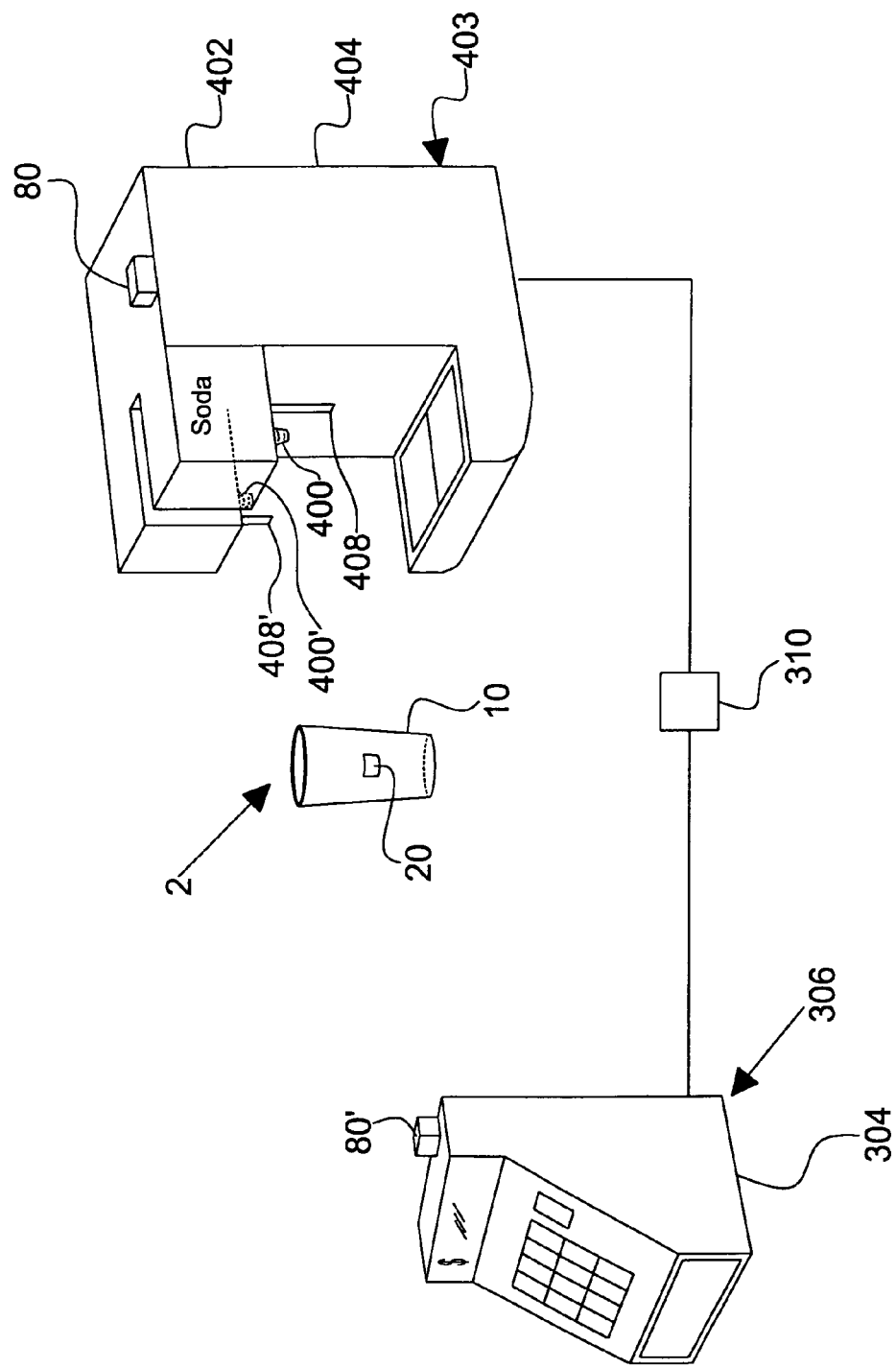
FIG. 7 is a schematic illustration of a transmitter and a communication device in accordance with another embodiment.

As illustrated in FIG. 7, drinkware device 2 has RF device 20, which is coupled to container 10 and in communication with the register system 306 and/or the liquid dispenser system 403. In the illustrated embodiment of FIG. 7, register system 306 and liquid dispenser system 403 are in communication with a controller 310.

Register system 306 comprises a transmitter 80' (as discussed above) that preferably communicates with a register 304. The register could include an integrated transmitter. Alternatively, the system could use a separate transmitter which does not communicate with the register and, for example, includes a separate input device, such as a touch pad. In one embodiment, register 304 is a cash register that is used to determine the cost of the customer's order. Transmitter 80' can be in communication with the register so that data is exchanged between RF device 20 and transmitter 80' when the customer buys a drink and receives drinkware device 2, preferably to use with a self serve fountain machine.

Liquid dispenser system 403 comprises a liquid dispenser in the form of a fountain machine 402 in communication with transmitter 80. Fountain machine 402 comprises a lever 408 that can be moved to cause a nozzle 400 to dispense a liquid, such as soda. Although not illustrated, fountain machine 402 can have a button that can be depressed to cause liquid to be dispensed from nozzle 400 or can comprise a sensor which detects the presence of the cup and actuates the dispenser. Fountain machine 402 can have plurality of nozzles 400, 400' and levers 408, 408', similar to conventional multi-drink self serve fountain machines.

Controller 310 can be in communication with register system 306 and the liquid dispensing system 403. Register system 306 and liquid dispensing system 403 have transmitters 80', 80, respectively, and are in communication with controller 310. For example, controller 310 can receive signals from transmitter 80' and then can communicate with liquid dispensing system 403 to cause fountain machine 402 to dispense or not dispense liquid when lever 408 is moved. In one embodiment, when the customer buys a drink, register 304 sends a signal based on data from transmitter 80'. Controller 310 can communicate with transmitter 80 to control the liquid dispensed by fountain machine 402. Alternatively, controller 310 can let the restaurant know, for example, through a signal to the register system and/or a display, that someone is seeking an unauthorized refill. Preferably, transmitter 80 is proximate to fountain machine 402 to ensure proper communication between transmitter 80 and device 20. Although not illustrated, controller 310 can be at various locations on the vendor' premises. For example, controller 310 can be within a housing 404 of fountain machine 403 or underneath a counter, preferably not accessible to the public. Of course, the vendor can be a drink seller, such as a fast food restaurant, food court, a concession stand (e.g., at an amusement park), cafeteria, or the like.

As discussed above, drinkware device 2 can preferably be a disposable cup that is sold by a vendor, such as a restaurant. Drinkware device 2 can made of inexpensive containers 10, such as paper cups, and inexpensive RF devices 20 for a low cost drinking container that can be sold in restaurants, preferably fast food restaurants.

Customers may buy a drink at a vendor in the form of a restaurant where the restaurant provides the customer with a cup that the customer takes to a self serve fountain machine. Upon reaching the fountain machine, the customer can fill up the cup with a liquid (e.g., soda) themselves. Controller 310 can be programmed to determine whether drinkware device 2 should be filled by fountain machine 402. The restaurant may limit the number of refills or prohibit customers from using a single cup for multiple visits to the restaurant. Despite the restaurant's policies, customers may refill up their cup more than the allowed number of times without making proper payment. Restaurants may have a policy that the customer can purchase a cup that they can fill one time. If the customer wants to refill their cup, they may have to pay for the refill. Other times, restaurants may also have a policy that customers cannot use the same cup for multiple visits to the restaurant. For example, the restaurant may sell the cup to the customer so that the customer can refill the cup during a single continuous visit to the restaurant. Despite the restaurant's policies, after the customer leaves the restaurant, the individual may return to the restaurant for a second visit and reuses the cup that they purchased during the first visit without making any payment. Coded authorization for dispensing may prevent or decrease unauthorized refills.

A program 900 can be used by controller 310 and can be based on time, amount of liquid dispensed, number of fill ups, or the like. The customer can buy a drink, i.e. device 2, in a restaurant. Device 2 and register system 306 communicate and provide data to controller 310. In one embodiment, transmitter 80' sends and receives a signal from RF device 20 and provides data to register 304, which sends a signal to controller 310 indicating that device 2 has been purchased. Register system 306 communicates with controller 310 which can have program 900 to limit the amount of liquid that fountain machine 402 dispenses to any drinkware device 2.

Figure 8:
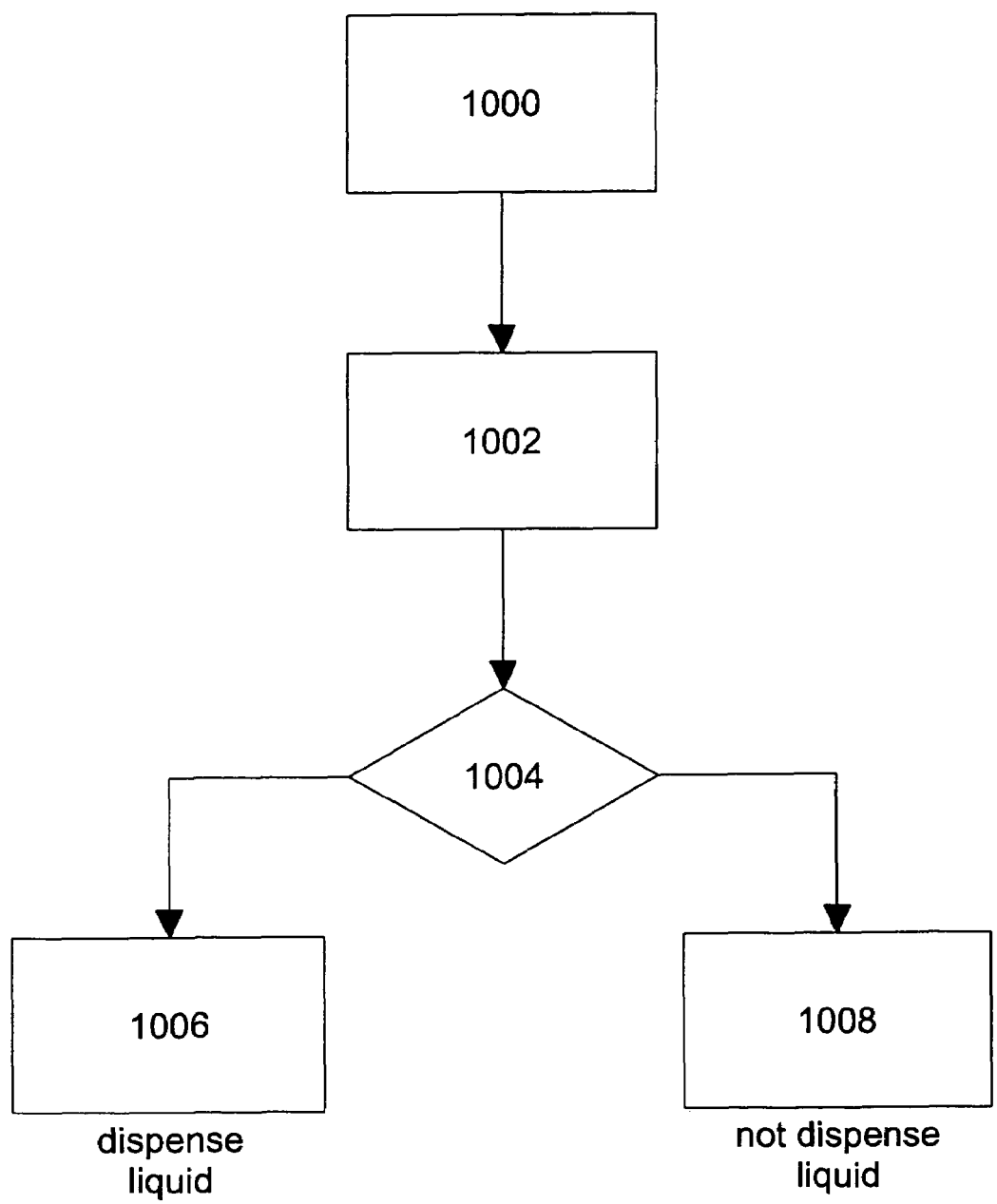
FIG. 8 is a flow chart of a program of in accordance with another embodiment.

FIG. 8 is a flow chart illustrating steps of program 900 that can be used by controller 310. In step 1000, RF device 20 communicates with transmitter 80. Preferably, RF device 20 and transmitter 80 communicate the when drinkware device 2 is under or near nozzle 400. Thus, fountain machine 402 can have plurality of nozzles 400, 400' and can determine which of nozzles 400, 400' drinkware device 2 is under or near.

In step 1002, liquid dispensing system 403 sends a signal to controller 310 that device 2 is under nozzle 400. In step 1004 controller 310 determines whether liquid dispensing system 310 should dispense liquid out of nozzle 400 to fill device 2. In one embodiment, for example, fountain machine 402 only fills drinkware device 2 one time. After drinkware device 2 is filled, fountain machine 402 will not dispense liquid out of nozzle 400 when lever 408 is moved. In another embodiment, fountain machine 402 can fill drinkware device 2 a certain number of times. After drinkware device 2 is filled the set number of times, fountain machine 402 will not dispense liquid out of nozzle 400 when lever 408 is moved. In yet another embodiment, fountain machine 402 can fill drinkware device 2 during a period of time. For example, register system 304 can communicate to indicate to controller 310 that drinkware device 2 has been sold. Controller 310 permits drinkware device 2 to be filled for the period of time, for example, in the range of about 0.5 hour to 1 hour. Thus, the customer can fill drinkware device 2 while they eat. Alternatively, the time period could be one half day or all day. However, the customer cannot fill drinkware device 2 during another visit after the programmed period of time.

If program 900 determines that fountain machine 403 should dispense liquid, controller 310 proceeds to step 1006 and sends a signal to fountain machine 402 so that fountain machine 402 dispenses liquid into drinkware 2, under nozzle 400, when lever 408 is moved. However, if the program determines that fountain machine 402 should not dispense liquid, controller 310 proceeds to step 1008 and sends a signal to fountain machine 402 so that fountain machine 402 does not dispense liquid into drinkware 2 under nozzle 400 when lever 408 is moved. If fountain machine 402 has plurality of nozzles 400, 400' fountain machine 402 can fill drinkware device 2 under nozzle 400 while not filling another drinkware device 2 under other nozzle 400. That is, program 900 can operate independently for each nozzle of fountain machine 402. Again, if an individual tries to have fountain machine 402 dispense liquid in violation of the vendor's policies, the liquid dispensing system 403 can have a buzzer, alarm, or the like, to alert the workers that an individual is improperly trying to obtain a drink.

In one embodiment, drinkware device 2 can have RF device 20 responsive to a video game. For example, the user can play a web-based game on a computer. RF device 20 can receive a signal from the computer and then activates sensory device 40 at various times, for example, when a player or enemy dies, during the game. The activation of sensory device 40 can further increase the user's satisfaction during the gaming experience.

Figure 6:
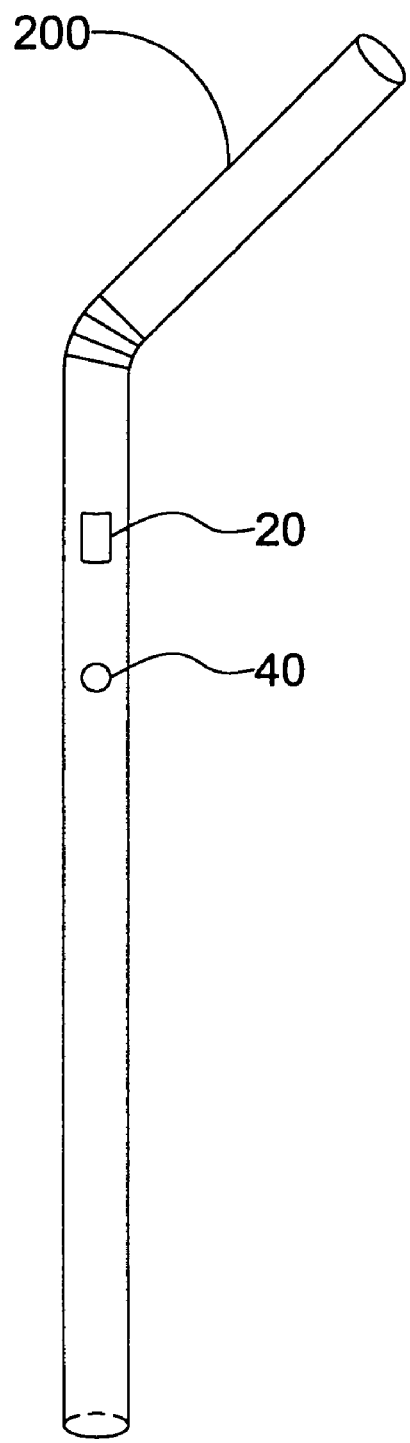
FIG. 6 is an illustration of a drinkware device in accordance with another embodiment

Those skilled in the art recognize that RF device 20 can be used in various other applications. For example, as illustrated in FIG. 6, RF device 20 can be coupled to a straw 200. Of course, RF device 20 could also be coupled to a lid for a cup.

While particular forms of the invention have been described, it will be apparent that various modifications can be made without departing from the spirit and scope of the invention. Accordingly, it is not intended that the invention be limited, except as by the appended claims.

What is claimed is:

1. A drinking system comprising:
a handheld drinking container;
a transmitting and receiving unit positioned remotely from said drinking container;
a sensory device coupled to the handheld drinking container; and
a communication device coupled to the handheld drinking container in communication with the transmitter and the sensory device, said communication device including a memory for storing user preferences and payment information and being adapted to send and receive signals from said transmitting and receiving unit and send signals to said sensory device to activate said sensory device in response to said signals received from said transmitting and receiving unit.

2. The drinking system of claim 1, wherein the transmitter can send a RF signal and the communication device can receive the RF signal.

3. The drinking system of claim 2, wherein the communication device can send a RF signal.

4. The drinking system of claim 1, wherein the communication device comprises a RF chip powered by a power supply.

5. The drinking system of claim 1, wherein the communication device comprises a radio frequency identification chip.

6. A drinking container for use with a beverage dispensing system capable of interpreting and updating information based on customer selections, said drinking container comprising:
a body including an upper rim, a side wall and a bottom forming an interior space for containing a beverage; and
an RF device coupled to said body, said RF device adapted to send a first signal to a transmitter operatively connected to a beverage dispenser and receive and store information sent via a second signal from said transmitter, said first signal including customer preference or payment information and said second signal including updated customer preference or payment information;

wherein the drinking container further includes a sensory device coupled to the container and in communication with said RF device, and wherein said sensory device is activated in response to an activation signal from said transmitter.

7. A method of dispensing a liquid from a beverage dispenser having a plurality of dispensing heads and a plurality of actuators, each actuator corresponding to a type of beverage, said method comprising the steps of:

providing a handheld drinking container having a RF device, said RF device capable of sending and receiving signals and storing information;

providing a transmitter that communicates with the RF device;

sending a signal from said RF device to said transmitter, said signal containing information about quantity of beverage purchased;

determining whether said signal includes authorization to fill said container;

opening the one or more dispensing heads if a refill is authorized;

allowing a user to select a type of beverage and commence dispensing by engaging an actuator;

dispensing a quantity of beverage;

subtracting the quantity of beverage dispensed from the quantity of beverage purchased to determine the quantity of beverage remaining; and writing the quantity of beverage remaining onto said RF device.

8. The method of claim 7, wherein the handheld drinking container is a disposable cup.

9. The method of claim 7, wherein the transmitter is operatively connected to said beverage dispenser.

10. A method of dispensing a liquid from a beverage dispenser having an RF transmitter/receiver, one or more dispensing heads and one or more actuators, said method comprising the steps of:

providing a handheld drinking container having a RFID tag;

sending a signal from said RFID tag to said transmitter/receiver, said signal containing user preferences or payment information;

interpreting said user preferences or payment information;

determining whether said user preferences or payment information includes authorization to fill said container;

opening the one or more dispensing heads if dispensing is authorized;

allowing a user to make select a type of beverage;

allowing a user to commence dispensing by actuating said one or more actuators corresponding to the selected beverage;

updating said user preferences or payment information based on a selection made by the user;

transmitting a signal to said RFID tag including updated user preferences or payment information; and storing said user preferences or payment information on said RFID tag.

11. The method of claim 10 wherein said payment information includes a number of available paid refills.

12. The method of claim 11 wherein said step of updating user preferences or payment information includes reducing the number of available paid refills by one.

13. The method of claim 10 wherein said user preferences includes type of drink selected, shows or events attended, age, sex, or name.

14. The method of claim 13 further comprising sending a signal to activate a sensory device, said sensory device being in communication with said RFID tag.

15. The method of claim 10 further comprising the step of displaying an advertisement based on said user information transmitted by said signal.

16. The method of claim 15 wherein said sensory device is a visual display.

17. The method of claim 16 wherein said advertisement is displayed by said visual display.

* * * * *